US012353492B1

(12) United States Patent
Brussow et al.

(10) Patent No.: US 12,353,492 B1
(45) Date of Patent: Jul. 8, 2025

(54) MACHINE LEARNING SYSTEM AND METHOD FOR TARGETED GROWTH PROJECTION OF MARKET INQUIRY RESULTS

(71) Applicant: Terakeet LLC, Syracuse, NY (US)

(72) Inventors: Jennifer Brussow, Syracuse, NY (US); Patrick Danial, Syracuse, NY (US); Christopher Pasquarella, Syracuse, NY (US)

(73) Assignee: Terrakeet LLC, Syracuse, NY (US)

( * ) Notice: Subject to any disclaimer, the term of this patent is extended or adjusted under 35 U.S.C. 154(b) by 0 days.

(21) Appl. No.: 19/001,083

(22) Filed: Dec. 24, 2024

Related U.S. Application Data

(63) Continuation-in-part of application No. 18/654,419, filed on May 3, 2024, now Pat. No. 12,182,217.

(51) Int. Cl.
G06F 16/9538 (2019.01)
G06F 16/955 (2019.01)

(52) U.S. Cl.
CPC ...... *G06F 16/9538* (2019.01); *G06F 16/9566* (2019.01)

(58) Field of Classification Search
CPC .................... G06F 16/9538; G06F 16/9566
See application file for complete search history.

(56) References Cited

U.S. PATENT DOCUMENTS

| | | | |
|---|---|---|---|
| 2007/0226640 A1 | 9/2007 | Holbrook et al. | |
| 2009/0187659 A1* | 7/2009 | Savoure | H04L 67/306 709/226 |
| 2012/0005207 A1 | 1/2012 | Gulhane et al. | |
| 2015/0227524 A1 | 8/2015 | Gouyet et al. | |
| 2016/0224662 A1 | 8/2016 | King et al. | |
| 2019/0014169 A1* | 1/2019 | Chung | H04L 63/102 |
| 2021/0374164 A1 | 12/2021 | Ghoula et al. | |
| 2022/0207030 A1 | 6/2022 | Chowdhury | |
| 2023/0334070 A1 | 10/2023 | Gullapudi et al. | |
| 2023/0360388 A1 | 11/2023 | Singh | |
| 2023/0394105 A1* | 12/2023 | Golan | G06F 16/9558 |

* cited by examiner

*Primary Examiner* — Cam Y T Truong
(74) *Attorney, Agent, or Firm* — Charles B. Lobsenz; Brian H. Buck; Potomac Law Group, PLLC

(57) ABSTRACT

Provided are a system and method for obtaining, according to current and historical URL placement(s) on search engine results pages (SERPs) for identified keywords, predicted URL performance in SERP positioning. Such performance can, using URL titles and snippets appearing on SERPS, be assessed for URLs filtered to meet targeted (i.e., non-branded, informational, transactional) classifications. When a machine learning model receives input, including, for example, (a) historical trajectories of SERP positions for filtered URLs matched for identified keywords, (b) URL classification as informational or transactional, and (c) URL work type categorization (e.g. optimization, new Content, or no action), positioning for an analyzed URL on one or more SERPs returned for query according to one or more identified keywords can be predicted for a predetermined time horizon.

14 Claims, 6 Drawing Sheets

1 {'seq_in_in': [[35], [33], [29], [21], [14], [0]], 'groups_in': [2, 0]}

*FIG. 3B*

1 {'predictions': [[5.64286844, 5.53708733, 5.36778975, 5.14905886, 5.10353184, 4.6812582, 4.00735035, 4.06442118, 3.97083855, 3.91520858, 3.92497882, 4.12070608, 4.52105188, 4.3701, 5.02115917, 5.47493792, 5.83061457, 6.55548859, 6.51404236, 6.52813, 6.68823957, 6.80397224, 7.03738213, 6.77492857]]}

*FIG. 3C*

MACHINE LEARNING SYSTEM AND METHOD FOR TARGETED GROWTH PROJECTION OF MARKET INQUIRY RESULTS

CROSS REFERENCE TO RELATED APPLICATION

This application is a continuation-in-part of U.S. patent application Ser. No. 18/654,419, filed on May 3, 2024, the entire contents of which are incorporated herein by reference.

FIELD OF THE DISCLOSURE

Disclosed embodiments relate to assessing uniform resource locator (URL) positioning among URLs returnable for a particular market inquiry indicated by one or more input keywords, and more specifically, to predicting URL positioning according to current and historical performance of URL and keyword associations appearing upon search engine results pages (SERPs) obtained in response to a search query.

BACKGROUND

Sustainability and expansion of web based properties offering products and/or services depend on ease of recognition by an interested audience of consumers. To enhance that recognition, operators of such properties typically seek to optimize SERP positioning of relevant, associated URLs to achieve, for example, URL prioritization that can allow users to more easily navigate a website. These URLs desirably encompass category and/or intent of keywords used in searching for a sought after product and/or service. Thus, inspection of the relationship(s) between URLs and keywords that can foster success of a particular web property in terms of search engine ranking can be instrumental to achieving prosperity.

All too often, however, and especially when a web property is thriving in terms of recognition leading to a boost in sales, the ways in which products and/or services are marketed can often lack being updated in a way which would provide even greater benefit. In other words, the status quo can set in until such time that a slump in production and/or profitability becomes realized. In many cases, the slump can stem from a number of causes, including, for example, mismanagement of the web property, simple lack of desire for the product and/or service due to competition, and unawareness of offerings. Frequently, one or more of these scenarios can be attributed to varying degrees of staleness of promotion of the web property due to outdatedness or insufficiency for search engine optimization (SEO).

SUMMARY

It is to be understood that both the following summary and the detailed description are exemplary and explanatory and are intended to provide further explanation of the present embodiments as claimed. Neither the summary nor the description that follows is intended to define or limit the scope of the present embodiments to the particular features mentioned in the summary or in the description. Rather, the scope of the present embodiments is defined by the appended claims.

Embodiments may include a method and system regarding predicting uniform resource locator (URL) positioning, including generating, for one or more identified keywords, a plurality of corresponding URLs for search engine result pages (SERPs); determining one or more classifications of each of the plurality of URLs; and filtering the plurality of URLs by the one or more classifications.

The method and system may further include generating a filtered set of the plurality of URLs based on the exclusion of at least one of the one or more classifications; selecting, from the filtered set of the plurality of URLs, a subset of candidate URLs for optimization; and determining a plurality of URL characteristics corresponding to the filtered set of the plurality of URLs.

Still further, the method and system may include generating a prediction of SERP positioning of at least one of the URLs, of the filtered set of the plurality of URLs, for the one or more identified keywords by converting the plurality of URL characteristics into input for a machine learning model, and applying the input to the machine learning model and in response obtaining, for a predetermined time horizon measured from a current month, predicted SERP positions of the at least one of the URLs, of the filtered set of the plurality of URLs, for the one or more identified keywords.

BRIEF DESCRIPTION OF THE DRAWINGS

FIG. 3B illustrates an exemplary input vector representing designated URL characteristics that can be provided to the modeling of FIG. 3A, according to embodiments herein;

FIG. 3C illustrates an exemplary output vector representing predicted future URL SERP positions for URL/keyword pairs, as generated by the modeling of FIG. 3 in response to receipt and processing of an input vector as in FIG. 4, according to embodiments herein;

DETAILED DESCRIPTION

Figure 1:
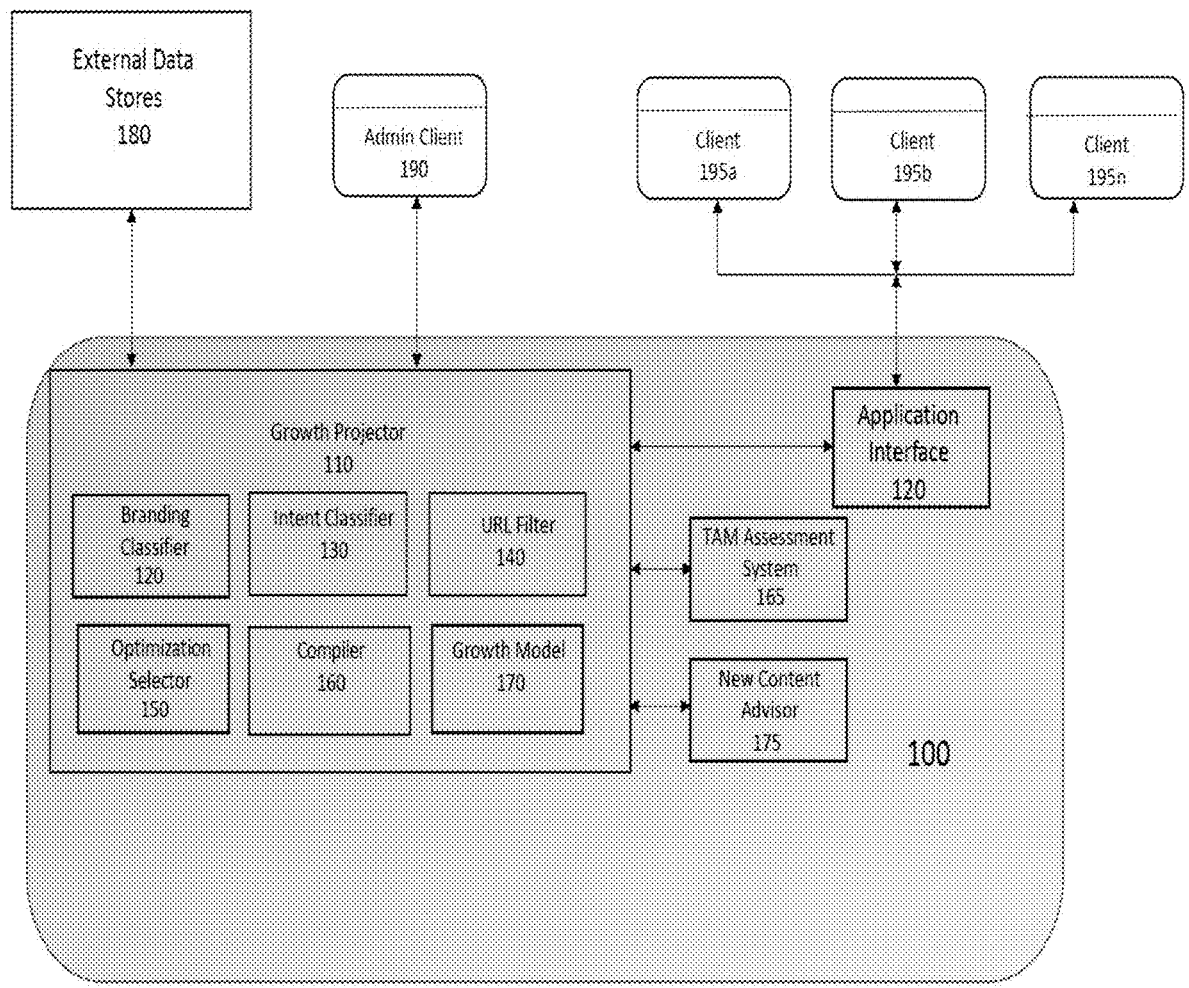
FIG. 1 illustrates elements of a Growth Projection System (GPS) enabling predicting of search engine results page (SERP) positioning for uniform resource locator (URL) and keyword pairing over a predetermined time horizon, according to embodiments herein.

The present disclosure will now be described in terms of various exemplary embodiments. This specification discloses one or more embodiments that incorporate features of the present embodiments. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. The skilled artisan will appreciate that a particular feature, structure, or characteristic described in connection with one embodiment is not necessarily limited to that embodiment but typically has relevance and applicability to one or more other embodiments.

In the several figures, like reference numerals may be used for like elements having like functions even in different drawings. The embodiments described, and their detailed construction and elements, are merely provided to assist in a comprehensive understanding of the present embodiments. Thus, it is apparent that the present embodiments can be carried out in a variety of ways, and does not require any of the specific features described herein. Also, well-known functions or constructions are not described in detail since they would obscure the present embodiments with unnecessary detail.

The description is not to be taken in a limiting sense, but is made merely for the purpose of illustrating the general principles of the present embodiments, since the scope of the present embodiments are best defined by the appended claims.

It should also be noted that in some alternative implementations, the blocks in a flowchart, the communications in a sequence-diagram, the states in a state-diagram, etc., may occur out of the orders illustrated in the figures. That is, the illustrated orders of the blocks/communications/states are not intended to be limiting. Rather, the illustrated blocks/communications/states may be reordered into any suitable order, and some of the blocks/communications/states could occur simultaneously.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc. It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

The word "exemplary" is used herein to mean "serving as an example, instance, or illustration." Any embodiment described herein as "exemplary" is not necessarily to be construed as preferred or advantageous over other embodiments. Additionally, all embodiments described herein should be considered exemplary unless otherwise stated.

Key to effectiveness in search engine optimization (SEO) is the ability to know how keywords may interrelate to one or more corresponding web addresses, i.e., uniform resource locators (URLs). For example, it can be beneficial to know whether one or more keywords appear in a URL itself, a title on or for a webpage returned as part of a search engine results page (SERP), or in a SERP snippet associated with a webpage. Moreover, it can be further beneficial to examine the URL/keyword interrelationship to learn how it affects positioning for the URL on a SERP. For instance, knowledge of the positioning may provide information as to how a URL or its represented website content will increase an audience for the website and/or traffic flowing to the website.

Accordingly, aspects of the present disclosure are directed to leveraging a history of URL positioning on SERPs for identified keywords to predict future URL positioning for a predetermined time horizon. For example, and with respect to keywords that are descriptive for a desired topic, the predicted URL positioning can be assessed with respect to each keyword. In this way, a website operator or someone acting on their behalf, can, using the predicted URL positioning, learn whether one or more keywords are linked to more preferable URL SERP positioning according to various criteria, such as a certain time of the year, timing for promotion of a product or service, etc. Additional aspects of the disclosure may be directed to implementing the predicted URL positioning in a correlation to expected monthly search volume (MSV). Using one or more of the predicted URL positioning and expected MSV, further aspects of the disclosure may be directed to providing a website operator a projected value of website traffic (based on the expected MSV and the predicted positioning given an associated click through rate (CTR)). Using this projected value of website traffic, respective conversion rates and associated values therefor can then be applied to arrive at an estimate for commensurate anticipated revenue.

Referring now to FIG. 1, there is illustrated a URL Growth Projection System (GPS) 100 (hereinafter "GPS") according to one or more embodiments herein directed to predicting future URL SERP positioning for identified keywords. GPS 100 may reside on a single cloud based server although it is also possible for various components of GPS 100 (as described herein) to reside on separate servers. By way of example, GPS 100 may be a computer implemented application which resides on a computing server. As will be apparent from the discussion herein, GPS100 may include and/or implement all appropriate software (i.e., algorithms) and/or hardware (i.e., storage, processors) for carrying out its applicable URL positioning predictions and related capabilities.

GPS 100 includes Growth Projector 110, which itself is comprised of a number of modules as discussed further herein. Growth Projector 110 operates to generate predictions for URL SERP positioning for identified keywords as more fully described herein. These predictions may be generated in response to requests originating from clients 195a, 195b . . . 195n. GPS 100 may be accessed through the internet or any other private or public network by one or more clients 195.

Each of clients 195 may be personal computers, laptops, handheld computing devices such as smartphones or tablets or any other device capable of providing the required connectivity and display. In some embodiments, a client 195 may be a computing application operated by a customer that is subscribed to GPS 100 and which desires prediction for URL SERP positioning in connection with selected websites and/or domains associated therewith. For example, client 195 may be an application or set of applications operated by an SEO consulting firm working on behalf of its clients and that owns and/or operates various website properties on the worldwide web. Alternatively, clients 195 may be used by the website owner/operator directly or clients 195 may be used by any other party interested in obtaining such prediction(s) with respect to one or more websites and/or related domains.

Clients 195 interact with GPS 100 such that data may be communicated between them via application interface 120 and such that GPS 100 may process requests for URL SERP predictions made by clients 195 and related results with regard to one or more of the above types of applications made by individuals or entities such as organizations. Results may be displayed on one or more user interfaces which preferably organize the output results in a way such that the results can be easily understood and applied by a user. Application interface 120 may comprise one or more application programming interfaces (APIs) that permit applications associated with clients 195 to communicate with GPS 100.

Also shown in FIG. 1 is admin client 190. Admin client 190 may comprise a personal computer, laptop, handheld computing devices such as smartphones or tablets or any other similar device. Admin client 190 is operative to allow users to configure, maintain and support the operation of GPS 100. For example, a user may use admin client 190 to interact with GPS 100 to set parameters regarding what is required to invoke the generation of URL SERP prediction and/or other related results as discussed in further detail below. For example, such parameters may include a certain percentage drop in SERP positioning currently being monitored and/or a certain percentage volatility in website traffic.

External data stores 180 may also be present according to the teachings of one or more embodiments herein. External data stores may comprise one or more external databases, data sets, systems, applications, rules bases and/or other sources of data, such as the world wide web (WWW), which may be used by GPS 100 to develop current and historical SERP positioning trajectories for given URLs.

Returning now to the specific components of GPS 100, GPS 100 may include various components for generating predictions for URL SERP positioning and for interacting with users via clients 195 in order to accept requests for positioning predictions and related results as well as providing the same to users via clients 195. In addition, GPS 100 may communicate with the WWW component of external data stores 180 via known protocols for various purposes, including to, in real time, ingest SERPs using one or more selected search engines and/or for accessing generative AI functionality to generate prediction data as more fully described herein. GPS 100 may reside on one or more physical servers. These servers may include electronic storage, one or more processors, and/or other components. The servers may also include communication lines, or ports to enable the exchange of information with a network and/or other computing platforms. The servers may include a plurality of hardware, software, and/or firmware components operating together to provide the functionality attributed herein to GPS 100.

Electronic storage associated with the servers may comprise non-transitory storage media that electronically stores information. The electronic storage media of electronic storage may include one or both of system storage that is provided integrally (i.e., substantially non-removable) with servers and/or removable storage that is removably connectable to the servers via, for example, a port or a drive.

Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage may include one or more virtual storage resources (e.g., cloud storage, a virtual private network, and/or other virtual storage resources). Electronic storage may store software algorithms, information determined by processors, information received from servers, information received from clients 195, and/or other information that enables the servers to function as described herein.

While an exemplary architecture is described above, it will readily be understood by one of skill in the art that an unlimited number of architectures and computing environments are possible while still remaining within the scope and spirit of the present embodiments.

In referring to FIG. 1, GPS 100 and, more particularly, its constituent Growth Projector 110, includes various ones of components which cooperate to render predictions for URL SERP positioning. In doing so, it will be understood that GPS 100 and constituent Growth Projector 110 may include and/or implement all appropriate software (e.g., algorithms)

and/or hardware (i.e., storage, processors) for carrying out one or more of the aforementioned predictions as are discussed herein.

In these regards, and for one or more embodiments as discussed herein, Growth Projector 110 may include, with respect to URL aggregation and/or other processing, a branding classifier 120, an intent classifier 130, a URL filter 140, an optimization selector 150, a compiler 160, and a growth model 170, for purposes more specifically described below. One or more of these components, when executing URL SERP positioning predictions, may be cooperable with Total Addressable Market (TAM) Assessment System 165 and New Content Advisor 175 as later described.

In regards to learning how SEO may be carried out for predicted URL SERP positioning according to embodiments herein, targeted keywords (representing a keyword universe (KWU)) for which SERPS may be applicable may be fed to GPS 100 via a client 195. In particular, such keywords may be fed to TAM Assessment System 165 to identify SERPs corresponding to those keywords. For a more detailed discussion of the obtaining of SERPs which may provide the basis for prediction of URL positioning on SERPs for identified keywords, see U.S. Pat. No-for underlying U.S. patent application Ser. No. 18/654,419, filed on May 3, 2024 and entitled "MACHINE LEARNING SYSTEM AND METHOD FOR TOTAL ADDRESSABLE MARKET ASSESSMENTS IN CONNECTION WITH KEYWORD QUALIFICATION," the entire contents of which is incorporated by reference herein.

After having obtained those SERPs corresponding to a provided KWU, Growth Projector 110 can engage URL filter 140 to sort those URLs for which an operator of a client 195 is interested. In this way, URLs for identified keywords are filtered for subsequent operation thereon by other constituent components of Growth Projector 110 in order to arrive at predicted URL SERP positioning.

These selected URLs for identified keywords can be further refined, for prediction purposes, to those URLs which are the subject of positioning prediction and potential optimization. Such refinement can be achieved according to operations performed by branding classifier 120, intent classifier 130, URL filter 140, and optimization selector 150, as are more fully discussed in connection with FIG. 2. For example, URL filter 140 may operate to filter, by classification, among URLs exhibiting branding classification and those which do not exhibit branding classification, as well as those URLs which exhibit transactional or informational classification, to reach a filtered, select set of URLs that excludes exhibited branding and otherwise corresponds to identified keywords. In this regard, exclusion of URLs exhibiting branding can, when providing prediction for URL SERP positioning, contribute to assessment of the extent to which predicted positioning for optimization of non-branded URLs may contribute to sitewide lift for a website. In this regard, branded URLs are excluded from consideration (e.g., prediction for future SERP positioning and optimization processing as discussed below) because their search engine ranking is often determined by inherent brand authority rather than SEO factors. For example, a URL containing 'nike.com/air-max-shoes' will naturally rank well due to the brand's reputation and domain authority, regardless of the page's SEO optimization. By filtering out these URLs, the system can focus on non-branded URLs, which rely more heavily on factors such as keyword relevance, content quality, and meta-tag optimization. Optimizing these non-branded URLs allows for a more precise evaluation of SEO efforts and their contribution to overall sitewide lift. Additionally, branded URLs can skew predictions by inflating the perceived effectiveness of strategies that may not apply to other URLs on the site.

Using this filtered, select set of URLs, Growth Projector 110 may engage compiler 160 to (a) aggregate their corresponding SERPs for a predetermined time period (e.g., a preceding window of six (6) months, including the month during which Growth Projector 110 was initially engaged by a client 195), and (b) create, with respect to one or more of the URLs for SERPs, corresponding position trajectories (e.g., URL initial position/rank on a SERP over a span of a number of months as in, for example, Jan-SERP position 10, February—SERP position 8, etc.). Once having formulated these trajectories, Growth Projector 110 may engage growth model 170 to predict future SERP positioning of URLs for identified keywords. In one or more embodiments, GPS 110 can, for one or more simulated new (i.e., previously unexamined) content URLs for which prediction of SERP positioning is desired by an operator of a client 195, engage new content advisor 170 in a manner as is described in connection with FIG. 2 below.

Figure 2:
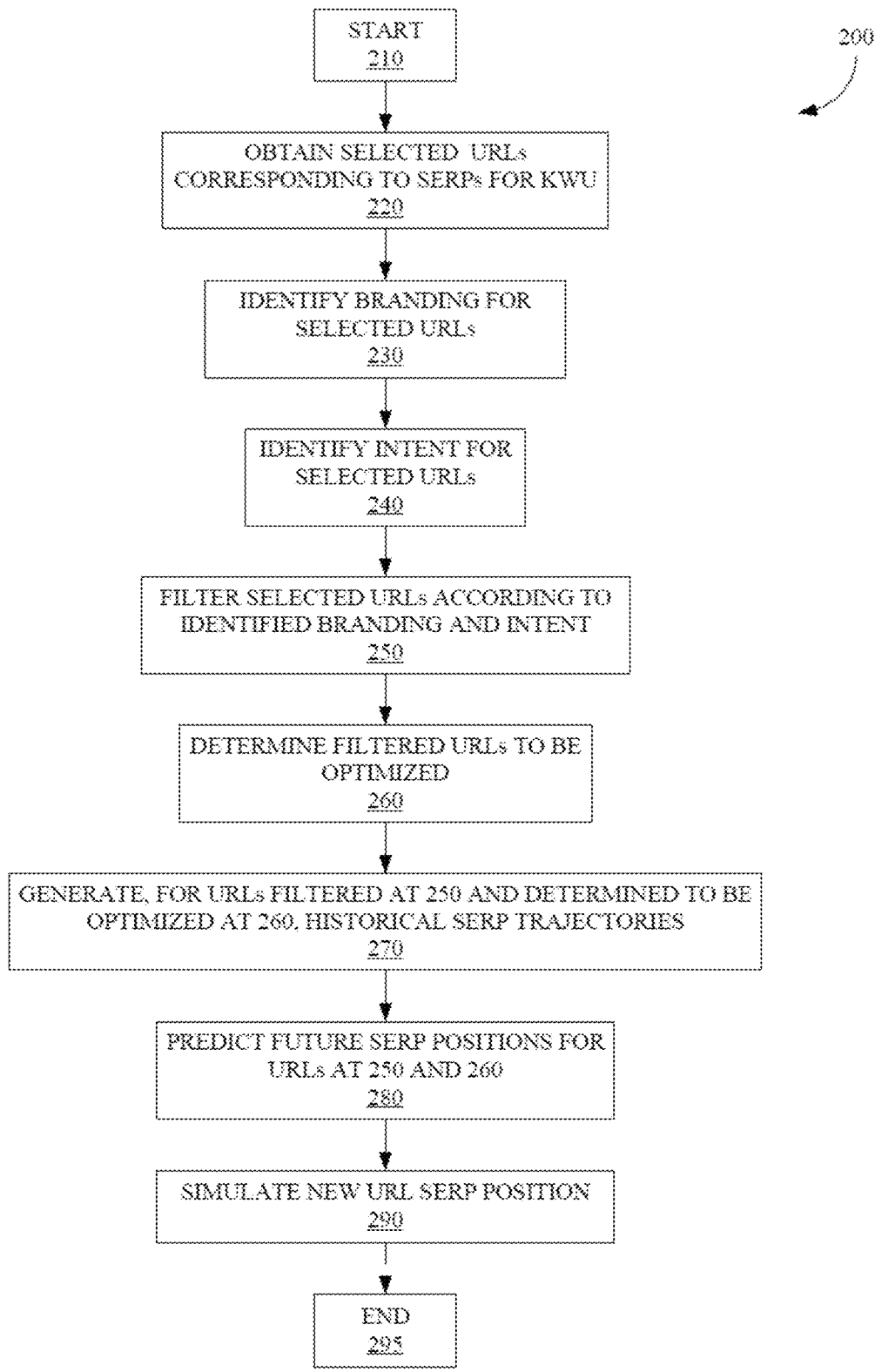
FIG. 2 illustrates a high-level flow diagram of a process of generating predictions for future SERP positions of one or more URLs for identified keywords selected from a keyword universe, according to embodiments herein.

In referring to FIG. 2, there is illustrated a process 200 of generating predictions for future SERP positions of one or more URLs for identified keywords selected from a KWU. Process 200 can begin at 210 and proceed to obtain, at 220, selected URLs corresponding to SERPs in relation to identified keywords. As has been discussed in connection with FIG. 1, the URLs can be filtered according to operations of URL filter 140 and TAM Assessment System 165 to obtain URLs for which prediction in SERP positioning is desired by an operator of a client 195. For each selected URL, process 200 can identify, at 230, whether a selected URL exhibits branding. In this context, branding classifier may be implemented as a specifically versioned OPENAI GPT-3 classifier or as a specifically versioned META llama-3-8B classifier appropriately trained to recognize branding for text comprising a URL. For instance, such classifiers may classify a URL containing "allterraintires" as "non-branded" and that which contains a named manufacturer as "branded." Thereafter, process 200 can proceed to 240 to, in accordance with operations of intent classifier 130 of FIG. 1, identify an intent of a URL as either transactional or informational. Similarly as in the case of operations at 230, operations at 240 can implement at least one of the discussed classifiers to conclude, for instance, that a URL containing "allterraintires/discounted-all-terrain-tires" conveys transactional intent (i.e., an invitation for purchase) and that which contains "allterraintires/all-terrain-vs-mud-tires" conveys informational intent (i.e., an invitation to learn distinctions between differing types or categories of information). In the case of each of operations of 230 and 240, the implemented classifiers can, for a selected URL, respectively determine branding or intent classification by examination of, for example, SERP information for identified keywords, including the URL, URL title, and SERP snippet.

In view of the above classifications, process 200 can proceed to 250 whereat results of operations 230 and 240 can, through operation of URL filter 140 (see FIG. 1) to exclude branded URLs, be filtered to generate a filtered, select set of URLs including non-branded, informational and transactional URLs. Filtering according to these classifications can be predetermined, i.e., preset, so as to realize impact on URL SERP positioning for various scenarios (e.g., conversion rate) that may be of interest to an operator of a client 195.

For these filtered URLs, process 200 can, using the optimization selector 150 shown in FIG. 1, determine, at 260, which of these URLs ought to be targeted for optimization. That is, the targeting may account for differing measures which are contributory to likelihood for optimization of SERP positioning performance. For example, such measures may include MSV (as may be compiled by, with reference to FIG. 1, coordination of compiler 160 and TAM Assessment System 165) and SERP ranking (for a given URL corresponding to one or more keywords). Through empirical study of these measures using the optimization selector 150, we, the inventors of the subject matter herein, determined that, for one or more identified keywords, URLs associated to higher MSV (i.e., MSV gauged relatively as between, for example, a pair of MSV counts assigned to respectively separate URLs) and URLs ranking in positions 6-15 on a SERP, returned for the one or more identified keywords, qualified as candidates for optimization, i.e., URLs to be optimized.

In connection with prediction of future SERP positioning discussed below, process 200 can, at 270, generate a historical SERP trajectory for all URLs filtered at 250 (i.e., URLs classified as non-branded, informational or transactional), which includes the subset of URLs determined to be optimized at 260. Content of the trajectories can include SERP positioning of a respective URL for one or more identified keywords over a predetermined historical time period including the preceding five (5) months as well as the current month during which the respective URL was drawn for keywords. In referring again to FIG. 1, it will be understood that a given trajectory can, through coordination between compiler 160 and TAM Assessment System 165, can assess positioning for the historical time period of six (6) months and be given as an exemplary vector of {SERP position$_{month1}$, SERP position$_{month2}$, SERP position$_{month3}$, etc.}, such as {10, 8, 7, 8, 6, 6}, for selected, exemplary months of January through June in a case in which a request for predicted URL SERP positioning is received in the month of June via a client 195. In this regard, it is to be appreciated that compiler 160 may conduct its SERP position trajectory in real time, such that data for that trajectory can coincide with a timing of the request for predicted URL SERP positioning. This way, Growth Projector 110 can avoid or minimize staleness of the trajectory.

Using these trajectories, process 200 can, at 280, predict future SERP positions for each of the URLs filtered at 250 to meet the non-branded, informational and transactional classifications, as well as the included subset of URLs determined at 260 to be optimizable candidate URLs. As will be discussed with reference to FIGS. 3A-4, the predicted positions can be generated using designated URL characteristics which can be fed to a machine learning model to learn predicted SERP positioning for a predetermined time horizon. In this regard, the horizon can encompass a 24-month period (extending immediately beyond the six (6) month historical time period) to enable an operator of a client 195 to grasp the impact of an ongoing (e.g., non-optimized) state of URL condition. That is, predictions according to this timeframe can inform estimation(s) of website traffic that can be associated with one or more of the URLs determined as an optimizable candidate URL (at 260) and/or a URL filtered (at 250). In this regard, it is contemplated that, in one or more embodiments, GPS 100 may, via an interface of application interface 120, provide access to a subscriber to GPS 100 so as to allow that entity to monitor prediction development and results.

As is further shown at 290, and prior to ending operations at 295, process 200 can, according to one or more embodiments herein, simulate SERP positioning of simulated new content URLs for identified keywords. That is, process 200 can project URL SERP positioning for these new URL options using historical accounts of changes in SERP positioning for URLs filtered at 250 (see FIG. 5 providing further discussion).

Figure 3A:
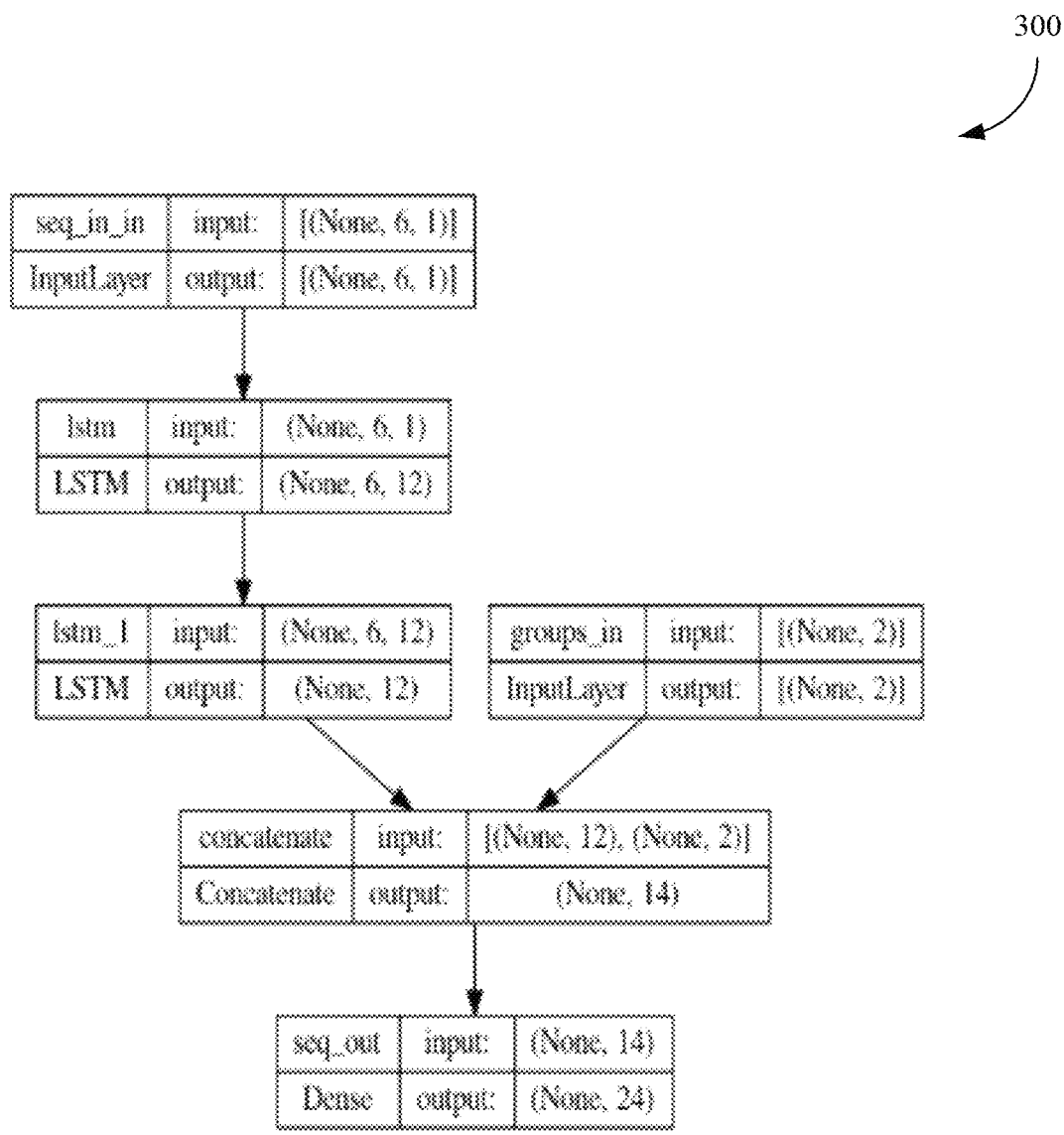
FIG. 3A is an illustration of exemplary modeling structured to execute the generating of predictions of FIG. 2, according to embodiments herein.
Figure 4:
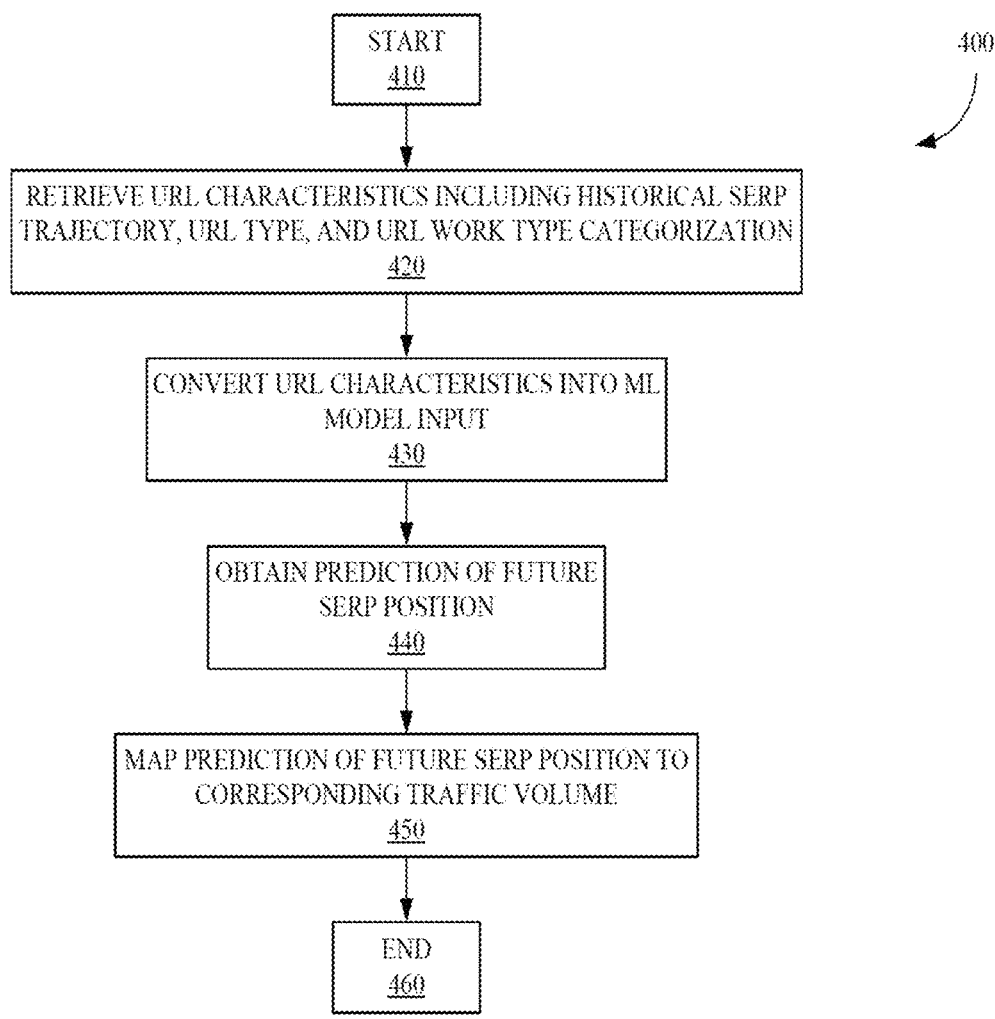
FIG. 4 illustrates a flow diagram of a process for generating predictions for future URL SERP positioning for URL/keyword pairs and corresponding URL optimization recommendations in view of the positioning.

In referring to FIGS. 3A-4, provided are aspects of operation of implementation of a machine learning model, according to one or more embodiments herein, that may be used to arrive at prediction of URL SERP positioning for identified keywords. Herein, the term "machine learning model" or "model" refers to a construct that is trained using training data to make predictions or provide probabilities for new data items, whether or not the new data items were included in the training data. For instance, training data for supervised learning can include positive and negative items with various parameters and an assigned classification. Examples of models include: neural networks (traditional, deeps, convolution neural network (CNN), recurrent neural network (RNN)), support vector machines, decision trees, decision tree forests, Parzen windows, Bayes, clustering, reinforcement learning, probability distributions, decision trees, and others. Models can be configured for various situations, data types, sources, and output formats. With reference to FIG. 3A, it is contemplated that the specifically implemented construct comprises a Long Short-Term Memory (LSTM) RNN configured to receive, for a URL selected for optimization, various corresponding URL characteristics on which the model is operative to predict SERP positioning. As shown, there is provided an exemplary model structure configured to provide predictions over the course of the aforementioned predetermined 24-month time horizon.

In one or more embodiments, the URL characteristics can comprise, for an examined URL, its historical SERP trajectory (as discussed with reference to 270 of FIG. 2), URL type coding as to whether the URL identifies as informational (e.g., coded "0") as opposed to transactional (e.g., coded "1"), and coding comprising a URL work type categorization (i.e., whether the URL is an intended subject for SERP positioning prediction), such as "0" indicating non-selection for optimization (e.g., exclusion of branded URLs at 250 in FIG. 2), "1" indicating a newly created URL for an operator of a client 195, and "2" indicating URL selection for optimization with respect to an existing URL maintained by an operator of a client 195.

Together, these URL characteristics can form machine learning model input that is converted to a format that the model is trained to receive, such as in the vector shown in FIG. 3B. In this instance, the RNN according to one or more embodiments herein can be trained with supervised learning and use training data that can be obtained from a history of URL SERP positionings for identified keywords as may be obtained from one or more resources of external data stores 180 (see FIG. 1). In this regard, respective URLs may correspond to, for example, various classifications, including branded, non-branded, and informational or transactional (herein, URL and classifications collectively referred to as URL data). More specifically, each item of the training data can include, for a periodic training period of a preceding 30 month period, an instance of a prior URL and its classifications matched to a corresponding URL SERP position for one or more identified keywords. As will be understood from the discussion above, the 30 month training period can be selected to encompass six (6) month historical time period and thus to equip the model to formulate prediction for URL SERP positioning for an upcoming 24-month time horizon. The matching can be performed according to a predetermined algorithm configured to receive the URL data and pair it with SERP positioning. During the model training, a representation of the URL data can be provided to the model (e.g., each as an element of a vector). Then, output from the model, i.e., SERP positioning for one or more identified keywords, can be compared to the actual matched URL data and SERP positioning and, based on the comparison, the model can be modified, such as by changing the training period and/or weights between nodes of the neural network or parameters of the functions used at each node in the neural network (e.g., applying a loss function). After applying each of the pairings of the inputs (URL data) and the desired outputs (SERP positioning for one or more identified keywords) in the training data and modifying the model in this manner, the model is trained to evaluate new instances of SERP positioning of a URL for one or more identified keywords.

Thus, in referring to FIG. 4 and its process 400 for achieving predictions of future URL SERP positioning for one or more identified keywords, the above-discussed training can be implemented beginning at 410, and proceed to 420 whereat process 400 can retrieve the aforementioned URL characteristics, of URLs filtered according to identified branding and intent (see 250 in FIG. 2) and URLs selected for optimization (see 260 in FIG. 2), for conversion to machine learning model input at 430. According to operations of the model, implemented as the LSTM RNN discussed above, on the URL characteristics compared with the model's constituent training, process 400 can return prediction of future SERP position for the examined URL at 440. In particular, monthly predicted positioning, for the discussed 24-month time horizon, can be output in vector form as is exemplified by FIG. 3C. There, it can be seen that the prediction for the horizon is relatively undulating, as may be commensurate with product and/or service demand relative to classification of the URL as either informational or transactional, for example.

In use of the month by month prediction for SERP positioning, process 400 can, at 450, and prior to ending operations at 460, map the same, on a corresponding interval basis, to respective estimates for website traffic according to MSV and the predicted positioning for the evaluated URL. Since each of the positions will be associated with a respective click through rate (CTR), the estimated website traffic can be evaluated (e.g., via applied conversion rate and associated conversion value) to arrive at estimated future revenue owing to the predicted URL positioning. As will be understood by one or ordinary skill in the art, the estimated future revenue may account for interaction(s) with both those URLs selected and not selected for optimization, such that the latter URLs become beneficial recipients in the context of sitewide lift. For instance, resulting improvement for evaluated URL positioning and/or increase in traffic volume may directly or indirectly positively impact the web property by causing, for example, conversions for URLs which were not selected for optimization as has been discussed herein.

In these ways, and as may be understood from operations of process 400, an operator of a client 195 can be apprised of how optimization for a currently managed URL may contribute to productivity, and, relatedly in various instances, profitability. Importantly, the URL may be harvested for interested keywords which are searchable among vast resources as are available from, for example, the WWW. As such, one of ordinary skill in the art will readily appreciate that an entirety of the process 400 is reliant on such vastness to identify URLs that maintain applicable correspondence to identified keywords. Hence, it will be understood that implementation of the modeling as is discussed herein is fundamental to the ability to reach URL SERP positioning predictions according to the discussed embodiments.

Figure 5:
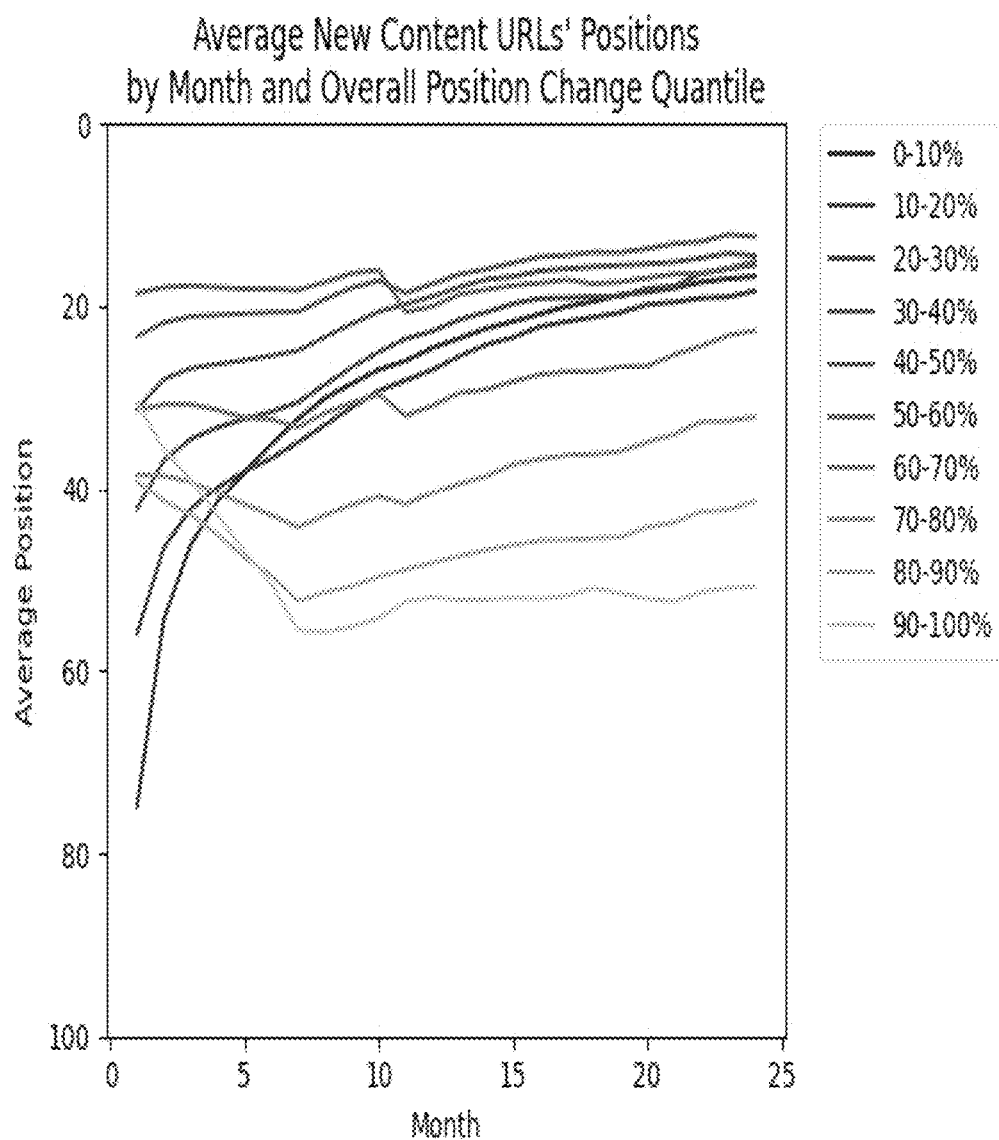
FIG. 5 illustrates simulation of SERP positioning for simulated new content URLs for URL/keyword pairs.

In referring to FIG. 5, one or more embodiments may provide for simulation of SERP positioning for new content URLs, i.e., URLs which are simulated and not currently in existence, with respect to previously assessed positioning for URL/keyword pairs. In this regard, the simulation may be conducted by new content advisor 175 (see FIG. 1) incorporating a predetermined algorithm. In particular, the algorithm can, for such new content URLs, assess likely beginning and ending SERP positions (i.e., ending positions as predicted according to FIG. 3C) from which overall change in SERP position can be deduced. Using this change in SERP position, the algorithm can then be executed to assign URL/keyword pairs to position quantiles (indicated by associated percentage groupings totaling 10 quantiles). Given these quantile assignments, the algorithm can be further executed to randomly assign a simulated new content URL to a predetermined quantile and further associate that URL to the SERP position trajectory corresponding to the quantile. Here, such a SERP position trajectory can be a trajectory that is similarly tracked for URL/keyword pairs in a manner discussed above for optimizable URLs at 270 in FIG. 2). Through this processing and when considering the addition of noise (e.g., skewing up to three (3) positions) to mimic the search landscape, average projected URL SERP positioning for identified keywords with respect to a new content URL can be obtained as is depicted in FIG. 5.

The present embodiments are not limited to the particular embodiments illustrated in the drawings and described above in detail. Those skilled in the art will recognize that other arrangements could be devised. The present embodiments encompass every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the present embodiments have been described with reference to specific illustrative embodiments, modifications and variations of the present embodiments may be constructed without departing from the spirit and scope of the present embodiments as set forth in the following claims.

While the present embodiments have been described in the context of the embodiments explicitly discussed herein, those skilled in the art will appreciate that the present embodiments are capable of being implemented and distributed in the form of a computer-usable medium (in a variety of forms) containing computer-executable instructions, and that the present embodiments apply equally regardless of the particular type of computer-usable medium which is used to carry out the distribution. An exemplary computer-usable medium is coupled to a computer such the computer can read information including the computer-executable instructions therefrom, and (optionally) write information thereto. Alternatively, the computer-usable medium may be integral to the computer. When the computer-executable instructions are loaded into and executed by the computer, the computer becomes an apparatus for practicing the embodiments. For example, when the computer-executable instructions are loaded into and executed by a general-purpose computer, the general-purpose computer becomes configured thereby into a special-purpose computer. Examples of suitable computer-usable media include: volatile memory such as random access memory (RAM); nonvolatile, hard-coded or programmable-type media such as read only memories (ROMs) or erasable, electrically programmable read only memories (EEPROMs); recordable-type and/or re-recordable media such as floppy disks, hard disk drives, compact discs (CDs), digital versatile discs (DVDs), etc.; and transmission-type media, e.g., digital and/or analog communications links such as those based on electrical-current conductors, light conductors and/or electromagnetic radiation.

Although the present embodiments have been described in detail, those skilled in the art will understand that various changes, substitutions, variations, enhancements, nuances, gradations, lesser forms, alterations, revisions, improvements and knock-offs of the embodiments disclosed herein may be made without departing from the spirit and scope of the embodiments in their broadest form.

What is claimed is:

1. A method of predicting uniform resource locator (URL) positioning, comprising:
    generating, by a computer system, for one or more identified keywords obtained from one or more external resources, a plurality of corresponding URLs for search engine result pages (SERPs);
    determining, by the computer system, one or more classifications of each URL of the plurality of corresponding URLs, wherein the one or more classifications comprise branding classification;
    filtering, by the computer system, the plurality of corresponding URLs by the one or more classifications to exclude branding classification for a respective URL;
    generating, by the computer system, a filtered set of the filtered plurality of corresponding URLs based on at least the excluded branding classification of the one or more classifications;
    selecting, from the filtered set of the plurality of corresponding URLs, a subset of candidate URLs for optimization, wherein the selecting candidate URLs for optimization is based on URLs of the filtered set of the plurality of corresponding URLs, and wherein a candidate URL of the selected candidate URLs comprises a monthly search volume (MSV);
    determining, by the computer system, a plurality of URL characteristics corresponding to the filtered set of the plurality of corresponding URLs;
    in response to a request from a client device, generating, by the computer system, a prediction of SERP positioning of the candidate URL of the selected candidate URLs for the one or more identified keywords by converting the plurality of URL characteristics into input for a machine learning model executed on the computer system;
    applying, by the computer system, the input to the machine learning model to evaluate the prediction of SERP positioning for a predetermined time horizon corresponding respective estimates of website traffic, and in response obtaining, for the predetermined time horizon measured from a current month, predicted SERP positions of the candidate URL of the selected candidate URLs for the one or more identified keywords; and
    providing, via an application interface of the computer system, an entity access to the predicted SERP positions of the candidate URL of the selected candidate URLs and display of the predicted SERP positions and the respective estimates of website traffic.

2. The method of claim 1, wherein:
    the one or more classifications further comprise non-branding for a respective URL, informational status of the respective URL, and transactional status of the respective URL.

3. The method of claim 1, wherein:
    the selecting candidate URLs for optimization is based on (a) between URLs of the filtered set of the plurality of corresponding URLs, a candidate URL comprising a higher monthly search volume (MSV) than another URL of the filtered set of the plurality of corresponding URLs, and (b) a candidate URL comprising a predetermined SERP position.

4. The method of claim 1, wherein:
    the plurality of URL characteristics comprises (c) SERP position trajectory evaluated for a predetermined historical time period comprising the current month and five (5) months prior, (d) classification of a respective URL as either informational or transactional, and (e) a work type categorization for a respective URL comprising, at least, selection for optimization.

5. The method of claim 1, wherein:
    the predetermined time horizon comprises 24 months.

6. The method of claim 5, wherein:
    the predicted SERP positions of the candidate URLs for the one or more identified keywords are generated monthly for the predetermined time horizon comprising 24 months.

7. The method of claim 1, further comprising:
    simulating, for a respective URL not included in the plurality of corresponding URLs for SERPs, a simulated trajectory of SERP positioning within the predetermined time horizon based on correspondence to the one or more identified keywords and one or more changes in URL SERP positioning for the plurality of corresponding URLs for SERPs.

8. A computing system for predicting uniform resource locator (URL) positioning, the computing system comprising:
    one or more processors; and
    one or more memories storing instructions that, when executed by the one or more processors, cause the computing system to perform a process comprising:
    generating, for one or more identified keywords obtained from one or more external sources, a plurality of corresponding URLs for search engine result pages (SERPs);
    determining one or more classifications of each URL of the plurality of URLs, wherein the one or more classifications comprise branding classification;
    filtering the plurality of corresponding URLs by the one of the one or more classifications to exclude branding classification for a respective URL;
    generating a filtered set of the filtered plurality of URLs based on at least the excluded branding classification of the one of the one or more classifications;
    selecting, from the filtered set of the plurality of URLs, candidate URLs for optimization, wherein the selecting candidate URLs for optimization is based on URLs of the filtered set of the plurality of corresponding URLs, and wherein one candidate URL of the selected candidate URLs comprises a monthly search volume (MSV);
    determining a plurality of URL characteristics corresponding to the filtered set of the plurality of URLs;
    in response to a request from a client device, generating a prediction of SERP positioning of the candidate URL of the selected candidate URLs for the one or more identified keywords by converting the plurality of URL characteristics into input for a machine learning model executed on the computer system;

applying the input to the machine learning model to evaluate the prediction of SERP positioning for a predetermined time horizon corresponding respective estimates of website traffic, and in response obtaining, for the predetermined time horizon measured from a current month, predicted SERP positions of the candidate URL of the selected candidate URLs for the one or more identified keywords; and providing, via an application interface of the computer system, an entity access to the predicted SERP positions of the candidate URL of the selected candidate URLs and display of the predicted SERP positions and the respective estimates of website traffic.

9. The computing system of claim 8, wherein:
the one or more classifications further comprise non-branding for a respective URL, informational status of a respective URL, and transactional status of a respective URL.

10. The computing system of claim 8, wherein:
the selecting candidate URLs for optimization is based on (a) between URLs of the filtered set of the plurality of URLs, a candidate URL comprising a higher monthly search volume (MSV) than another URL of the filtered set of the plurality of URLs, and (b) a candidate URL comprising a predetermined SERP position.

11. The computing system of claim 8, wherein:
the plurality of URL characteristics comprises (c) SERP position trajectory evaluated for a predetermined historical time period comprising the current month and five (5) months prior, (d) classification of a respective URL as either informational or transactional, and (e) a work type categorization for a respective URL comprising, at least, selection for optimization.

12. The computing system of claim 8, wherein:
the predetermined time horizon comprises 24 months.

13. The computing system of claim 12, wherein:
the predicted SERP positions of the candidate URLs for the one or more identified keywords are generated monthly for the predetermined time horizon comprising 24 months.

14. The computing system of claim 8, wherein:
wherein the process further comprises simulating, for a respective URL not included in the plurality of corresponding URLs for SERPs, a simulated trajectory of SERP positioning within the predetermined time horizon based on correspondence to the one or more identified keywords and one or more changes in URL SERP positioning for the plurality of corresponding URLs for SERPs.

\* \* \* \* \*